United States Patent
Fotheringham et al.

(10) Patent No.: US 12,162,802 B2
(45) Date of Patent: *Dec. 10, 2024

(54) GLASSES HAVING IMPROVED ION EXCHANGEABILITY AND THERMAL EXPANSION

(71) Applicant: Schott AG, Mainz (DE)

(72) Inventors: Ulrich Fotheringham, Wiesbaden (DE); Michael Schwall, Mainz (DE); Ulrich Peuchert, Bodenheim (DE); Miriam Kunze, Neustadt am Rübenberge (DE); Martun Hovhannisyan, Frankfurt am Main (DE); Holger Wegener, Alfeld (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,723

(22) Filed: Feb. 8, 2018

(65) Prior Publication Data

US 2018/0222790 A1 Aug. 9, 2018

(30) Foreign Application Priority Data

Feb. 8, 2017 (DE) ...................... 10 2017 102 482.4

(51) Int. Cl.
*C03C 3/093* (2006.01)
*C03C 3/091* (2006.01)
*C03C 10/00* (2006.01)

(52) U.S. Cl.
CPC .............. *C03C 3/093* (2013.01); *C03C 3/091* (2013.01); *C03C 10/0054* (2013.01); *C03C 2203/10* (2013.01); *C03C 2203/50* (2013.01)

(58) Field of Classification Search
CPC ................................ C03C 3/091; C03C 3/093
See application file for complete search history.

(56) References Cited

U.S. PATENT DOCUMENTS

| | | |
|---|---|---|
| 5,277,946 A | 1/1994 | Nagai et al. |
| 6,109,994 A | 8/2000 | Cho et al. |
| 6,794,323 B2 | 9/2004 | Peuchert et al. |
| 7,491,668 B2 | 2/2009 | Fechner et al. |
| 8,748,002 B2 | 6/2014 | Murata |
| 9,643,882 B2 | 5/2017 | Tratzky et al. |
| 9,919,949 B2 | 3/2018 | Kawamoto et al. |
| 10,051,753 B2 | 8/2018 | Ehemann et al. |
| 10,071,933 B2 | 9/2018 | Wang et al. |
| 10,099,956 B2 | 10/2018 | Choju et al. |
| 2010/0179044 A1 | 7/2010 | Sellier et al. |
| 2011/0014475 A1 | 1/2011 | Murata |
| 2013/0165312 A1 | 6/2013 | Komai et al. |
| 2015/0368146 A1 | 12/2015 | Ellison et al. |
| 2017/0183255 A1 | 6/2017 | Walther et al. |
| 2018/0222790 A1 | 8/2018 | Fotheringham et al. |
| 2018/0222791 A1* | 8/2018 | Fotheringham ......... C03C 3/093 |

FOREIGN PATENT DOCUMENTS

| | | |
|---|---|---|
| CN | 105621882 A | 6/2016 |
| DE | 20 2012 012 876 U1 | 3/2014 |
| DE | 10 2014 101 756 A1 | 8/2015 |
| DE | 10 2014 119 594 A1 | 6/2016 |
| JP | 2008195602 A * | 8/2008 ........... C03B 17/064 |

OTHER PUBLICATIONS

Shelby, J.E., Introduction to Glass Science and Technology, 1997, The Royal Society of Chemistry, Chapter 3, pp. 25-47. (Year: 1997).*
Conradt, Reinhard, Chemical structure, medium range order, and crystalline reference state of multicomponent oxide liquids and glasses, 2004, Journal of Non-Crystalline Solids, 345& 346, pp. 16-23. (Year: 2004).*
Kucuk et al., Differences between surface and bulk properties of glass melts I. Compositional differences and influence of volatilization on composition and other physical properties, 2000, Journal of Non-Crystalline Solids, 261, pp. 28-38. (Year: 2000).*
Shelby, J.E., Introduction to Glass Science and Technology, 1997, The Royal Society of Chemistry, Chapter 3, pp. i-v, 25-47. (Year: 1997).*
German Office Action dated Mar. 7, 2019 for German Application No. 10 2017 102 482.4 (5 pages).
Japanese Office Action, including an English translation thereof, dated Mar. 4, 2019 for Japanese Application No. 2018-019995 (13 pages).
German Office Action dated Sep. 21, 2017 for German Application No. 10 2017 102 482.4 (4 pages).
"Nonexponential relaxations in strong and fragile glass formers", R. Bohmer, K.L. Ngai, C.A. Angell and D.J. Plazek, J. Chem. Phys. 99, pp. 4201-4209, Sep. 1, 1993 (10 pages).
"Relaxation in Glass and Composites", George W. Scherer, Krieger Publishing Company Malabar, Florida, 1992 (83 pages).
"Non-linearity and non-exponentiality of primary relaxations", Roland Bohmer, Journal of Non-Crystalline Solids, 172-174, pp. 628-634, 1994 (7 pages).
"Relationship between viscous dynamics and the configurational thermal expansion coefficient of glass-forming liquids", Raphael M.C.V. Reis, John C. Mauro, Karen L. Geisinger, Marcel Potuzak, Morten M. Smedskjaer, Xiaoju Guo, Douglas C. Allan, Journal of Non-Crystalline Solids 358, pp. 648-651, 2012 (4 pages).

(Continued)

*Primary Examiner* — Elizabeth A. Bolden

(74) *Attorney, Agent, or Firm* — Taylor IP, P.C.

(57) ABSTRACT

The present invention relates to glasses having a composition made up of base glasses. The glasses have a good chemical toughenability in combination with an advantageous coefficient of thermal expansion. Owing to their composition and the production process, the homogeneity of the properties of the glasses at their surface is high compared to the bulk glass. Furthermore, the fragility of the glasses is low, so that they can be processed to produce very thin glass articles.

21 Claims, No Drawings

(56) References Cited

OTHER PUBLICATIONS

"Chemical structure, medium range order, and crystalline reference state of multicomponent oxide liquids and glasses", Reinhard Conradt, Journal of Non-Crystalline Solids, vols. 345-346, pp. 15-23, Oct. 15, 2004 (8 pages).
"First Principles Ionicity Scales", Alberto Garcia, Marvon L. Cohen, The American Physical Society, Physical Review B. vol. 47, No. 8, pp. 4215-4220, Feb. 15, 1993 (6 pages).
"Sodium self diffusion in natural minerals", Robert F. Sippel, Geochimica and Cosmochimica Acta, vol. 27, pp. 107-120, 1963 (14 pages).
"Calculation of Activation Energy of Ionic Conductivity in Silica Glasses by Classical Methods", O.L. Anderson and D.A. Stuart, Journal of the American Ceramic Society, vol. 37, No. 12, pp. 573-580 (8 pages).
"Optical Properties of Soda Lime Silica Glasses", M. Rubin, Solar Energy Materials 12, pp. 275-288, 1985 (14 pages).
"The Properties of Optical Glass", Hans Bach and Norbert Neuroth, second corrected printing, Schott-Series on Glass, Springer-Verlag Berlin Heidelberg New York, pp. 73-76, 1998 (24 pages).
"Fundamental Condition of Glass Formation", Kuan-Han Sun, Journal of The American Ceramic Society, vol. 30, No. 9, pp. 277-281, 1947 (5 pages).
"Die Kationenfeldstärken und ihre Beziehungen zu Entglasungsvorgängen, zur Verbindungsbildung und zu den Schmelzpunkten von Silicaten", A. Dietzel, Berichte der Bunsengesellschaft für physikalische Chemie vol. 48 No. 1, pp. 9-23, 1942 (15 pages).
"Revised Effective Ionic Radii and Systematic Studies of Interatomic Distances in Halides and Chalcogenides", R. Shannon, Acta Cryst., A32, pp. 751-767, 1976 (17 pages).
"Thick aluminium nitride films deposited by room-temperature sputtering for ultrasonic applications", C.K. Lee, S. Cochran, A. Abrar, K.J. Kirk, F. Placido, Ultrasonics 42, 485-490, 2004 (10 pages).
"Low-Temperature CMOS-Compatible 3D-Integration of Monocrystalline-Silicon Based PZT RF MEM Switch Actuators on RF Substrates", F. Saharil, R.V. Wright, P. Rantakari, P.B. Kirby, T. Väha-Heikkilä, F. Niklaus, G. Stemme, J. Oberhammer, 2010 IEEE 23rd International Conference on Micro Electro Mechanical Systems (MEMS), pp. 47-50, 2010 (5 pages).
German Office Action dated Jul. 9, 2019 for German Application No. 10 2017 102 482.4 (3 pages).
Machine Translation of German Office Action dated Jul. 9, 2019 for German Application No. 10 2017 102 482.4 (2 pages).
Japanese Office Action dated Nov. 5, 2019 for Japanese Patent Application No. 2018-019995 (3 pages).
Translation of Japanese Office Action dated Nov. 5, 2020 for Japanese Patent Application No. 2018-019995 (4 pages).
Chinese Office Action dated Apr. 27, 2020 for Chinese Application No. 201810112748.9 (8 pages).
German Office Action dated Nov. 30, 2021 for German Application No. 10 2017 012 297.0 (5 pages).
Japanese Office Action dated Dec. 6, 2021 for Japanese Patent Application No. 2020-081286 (5 pages).
English translation of Japanese Office Action dated Dec. 6, 2021 for Japanese Patent Application No. 2020-081286 (6 pages).
Chinese Office Action dated Oct. 9, 2021 for Chinese Application No. 201910675836.4 (3 pages).
English translation of Chinese Office Action dated Oct. 9, 2021 for Chinese Application No. 201910675836.4 (3 pages).
Chinese Office Action dated Oct. 9, 2021 for Chinese Application No. 201910813407.9 (3 pages).
English translation of Chinese Office Action dated Oct. 9, 2021 for Chinese Application No. 201910813407.9 (3 pages).
Chinese Office Action dated Apr. 14, 2021 for Chinese Application No. 201910675836.4 (8 pages).
Chinese Office Action dated Apr. 15, 2021 for Chinese Application No. 201910813407.9 (7 pages).

* cited by examiner

GLASSES HAVING IMPROVED ION EXCHANGEABILITY AND THERMAL EXPANSION

BACKGROUND OF THE INVENTION

1. Field of the Invention

The present invention relates to glasses and glass products which combine good chemical toughenability with low fragility and desired thermal expansion properties. The low fragility may serve to give a very substantial independence of the chemical toughening result from the thermal history, which, in the case of glasses which have been subjected to forming before prestressing, can differ significantly.

In one embodiment, the invention relates to ultra-thin glasses, which term refers to glasses having a thickness of 400 μm and below, down to 20 μm and less.

Production processes for such glasses and uses thereof are also provided by the present invention.

The present invention also relates to glasses having a composition made up of base glasses. The glasses are characterized by good chemical toughenability in combination with a desired coefficient of thermal expansion. Owing to their composition and the production process, the homogeneity of the properties of the glasses on their surface can be high compared to the bulk glass. Furthermore, the fragility of the glasses can be low, so that they can be processed to produce very thin glass articles.

2. Description of the Related Art

Glasses having good ion exchangeability, i.e. good chemical toughenability, and a low fragility and advantageous thermal expansion may be required for many applications. The importance of the fragility introduced by C. A. Angell as derivative of the decadic logarithm of the viscosity with respect to the variable ($T_G/T$) is its relationship to the number of configurational degrees of freedom in the glass, see, for example, R. Böhmer, K. L. Ngai, C. A. Angell, D. J. Plazek, J. Chem. Phys., 99 (1993) 4201-4209. The greater the fragility, the greater is the number of configurational degrees of freedom and the more different are the various configurations due to different thermal histories in which the glass can be present. TG is the glass transition temperature; i.e. in a definition via the viscosity curve, the temperature at which the viscosity is $10^{12}$ pascal seconds.

These different configurations in turn have an influence on the stress relaxation, i.e. the unavoidable antagonistic effect occurring when the stress is built up by ion exchange. This means that glass samples having one and the same composition but a different thermal history will build up different stresses in the same ion-exchange process. This is of particular importance for glass which is subjected to different forming processes, which naturally imply different thermal histories, before toughening.

The process of chemical toughening may also be referred to as chemical prestressing, chemical tempering, chemical strengthening, ion-exchange strengthening, ion-exchange tempering, ion-exchange toughening, or ion-exchange prestressing. All of these terms refer to a process wherein a smaller ion in a glass is replaced by a larger one, e.g. sodium is replaced by potassium, or lithium is replaced by sodium or potassium, thereby forming a compressive stress layer on the surface of the glass.

The thermoviscoelastic models which describe the stress relaxation are described, for example, in George W. Scherer: Relaxation in Glass and Composites. Krieger Publishing Company Malabar (1992); the relationship which the non-linearity parameter "x" describing the influence of the configuration on the thermal activation of stress relaxation has with the fragility is discussed, for example, in Roland Böhmer, Non-linearity and non-exponentiality of primary relaxations, Journal of Non-Crystalline Solids, 172-174 (1994), 628-634.

Since the glass may also be used in the non-toughened state, it is still important that a low fragility means a high dimensional stability of the glass at all possible thermal stresses below the glass transition temperature, which correlates with the configurational proportion of the coefficient of thermal expansion, see Raphael M. C. V. Reis, John C. Mauro, Karen L. Geisingera, Marcel Potuzak, Morten M. Smedskjaer, Xiaoju Guo, Douglas C. Allan, Relationship between viscous dynamics and the configurational thermal expansion coefficient of glass-forming liquids, Journal of Non-Crystalline Solids 358 (2012) 648-651, and via this configurational proportion of the coefficient of thermal expansion with, in turn, the number of configurational proportions (see above).

Ultra-thin glass can be affected by the fragility and the configurational proportion of the coefficient of thermal expansion. The thickness, which as described above spans a wide range, is determined by the mass throughput and drawing speed. If ultra-thin glass of one and the same glass type is to be produced using one and the same drawing facility, a constant mass throughput and uniform width of the sheet being drawn, the drawing speed firstly has to be selected proportionally to the reciprocal thickness to achieve the constant mass throughput and the uniform drawn sheet width. The differences in the drawing speeds are considerable owing to the abovementioned typical range of the glass thicknesses. Independently thereof, the glass runs through one and the same cooling section generally configured as cooling shaft after exit from the drawing nozzle, since the drawing facility is one and the same drawing facility and the temperatures at the beginning and end of the cooling section are the same. The temperature at the beginning is the same as the temperature in the drawing tank, and the temperature at the end is the temperature from which the glass can be handled freely. This means that the cooling rate also has to be proportional to the reciprocal thickness. The glass thus runs through the cooling shaft with significantly different cooling rates, and it is difficult, especially for high cooling rates, to realize a homogeneous temperature over the width of the sheet cross section. However, different temperature histories over the width of the glass sheet lead to distortions whose magnitude depends on these differences in the temperature history but also on the abovementioned configurational proportion of the coefficient of thermal expansion and thus the fragility. A low fragility thus ensures a certain robustness of the ultra-thin glass against adverse influences in the production process.

The use of such glasses as covering glasses for displays of electronic appliances can be of economic relevance. Here, measures which lead to a higher ion exchangeability often also lead to a higher fragility, and vice versa.

US 2013/0165312 A1 discloses covering glasses for semiconductor manufacture, which display a particular thermal expansion, low alpha radiation and a high elastic modulus. The glasses described there contain very high proportions of alkali metal oxides and alkaline earth metal oxides, by which means a high thermal expansion is said to be made possible. However, the glasses cannot be described by the base glass system of this invention because they differ in stoichiometric terms from the glasses of this invention. In addition, the glasses described there have very high proportions of $Al_2O_3$ and at the same time comparatively little MgO, so that a high proportion of albite would be expected, which increases the fragility. Furthermore, because of the very low $B_2O_3$ content the glasses described there lack the proportion of reedmergnerite desired according to the invention, which would again reduce the fragility. The abovementioned very high proportion of alkali metal oxides and alkaline earth metal oxides results in a high value of the coefficient of thermal expansion, which is at least $99.2 \times 10^{-7}$/K in the examples, and thus in fact very high.

DE 20 2012 012 876 U1 is concerned with the ion exchangeability of glasses. In the case of the glasses described there, the main focus is on the hydrolytic and mechanical resistance in order to avoid firstly fracture and splintering and secondly leaching of glass constituents. Most of the glasses in the document do not contain any $B_2O_3$. In many of the claimed compositions described there no boron is present at all. The proportion of boron is not quantified in the description. In the examples, there is a boron content of not more than 4.6%; however, at the same time a measurement rule according to which the boron content in mol % should be smaller than 0.3 times the difference between the sum of the proportions of alkali metal oxides and the proportion of aluminium oxide is presented. This measurement rule serves to achieve a very high ion mobility. The compositions described in the present invention do not overlap this measurement rule.

What is needed in the art is glasses which combine good chemical toughenability with low fragility and desired thermal expansion properties. In addition, the glasses should be able to be produced in modern sheet glass manufacturing processes.

SUMMARY OF THE INVENTION

The present invention provides a targeted combination of stoichiometric glasses, i.e. glasses which also exist as crystals in the same stoichiometry and whose properties can be assumed to be very similar in each case for glass and crystal because of the identical topology of the structural components, as has been examined in the literature in many examples by way of NMR measurements or the like. For this purpose, stoichiometric glasses are selected which can be combined to obtain a behaviour which can achieve the object of the invention. In the present patent application, these stoichiometric glasses are also referred to as "base glasses" or "constituent phases".

In the present invention, a high but not very high ion mobility is sought in order to achieve desired values for the fragility and the coefficient of thermal expansion. Why and how this is contradictory is explained in the description of the present invention.

It is not a new concept to describe glasses in terms of the constituent phases to be assigned thereto. Specification of the base glasses makes it possible to draw conclusions as to the chemical structure of a glass (cf. Conradt R: "Chemical structure, medium range order, and crystalline reference state of multicomponent oxide liquids and glasses", in Journal of Non-Crystalline Solids, Volumes 345-346, 15 Oct. 2004, Pages 16-23).

DETAILED DESCRIPTION OF THE INVENTION

The present invention provides a glass having a combination of base glasses, which can be characterized by the following phases constituting the glass:

TABLE 1

| Constituent phase | min. | max. |
|---|---|---|
| Albite | 10 mol % | 40 mol % |
| Reedmergnerite | 10 mol % | 65 mol % |
| Potassium reedmergnerite | 0 mol % | 32 mol % |
| Grossular | 0 mol % | 10 mol % |
| Cordierite | 0 mol % | 10 mol % |
| Willemite | 0 mol % | 15 mol % |
| Silicon dioxide | 0 mol % | 50 mol % |
| Diboron trioxide | 0 mol % | 15 mol % |
| Titanium wadeite | 0 mol % | 24 mol % |
| Strontium feldspar | 0 mol % | 20 mol % |
| Celsian | 0 mol % | 20 mol % |
| Optional balance | 0 mol % | 5 mol % |

The glasses of the present invention can be characterized by their composition and their constitution. The composition is selected in terms of the phases constituting the glass within the limits described herein.

The phases constituting the glass are of course not present in crystalline form but in amorphous form in the glass product. However, this does not mean that the constituent phases have completely different structural components in the amorphous state than in the crystalline state. As stated above, the topology of the structural components, i.e., for example, the coordination of the participating cations to surrounding oxygen atoms or the interatomic distance resulting from the coordination and strength of the bond between these cations and surrounding oxygen atoms, is comparable. For this reason, many properties of the glass of the invention can be described well in terms of the constituent phases, in particular in order to indicate the inventive achievement and the problems overcome by the invention (cf. Conradt R., loc. cit.). Here, the glass can naturally be produced not only using the corresponding crystals but also using conventional glass raw materials as long as the stoichiometric ratios permit the formation of the appropriate structural components of the base glasses.

The chemical toughenability by replacement of sodium by potassium in a suitable salt melt, e.g. potassium nitrate, is achieved in the case of the inventive glasses by a substantial proportion of structural components which contain sodium and have a high sodium mobility. An example of a constituent phase which positively influences the chemical toughenability is albite. The glasses and glass articles according to the present invention can be chemically toughened.

The desired value of the fragility can be mapped onto a condition for the parameter actually addressed, namely the number of configurational degrees of freedom, and an appropriate calculation method. According to the studies by C. A. Angell (see, for example, R. Böhmer, K. L. Ngai, C. A. Angell, D. J. Plazek, J. Chem. Phys., 99 (1993) 4201-4209), the fragility is equal to a minimum value which would be obtained for a course of the viscosity curve following the Arrhenius law and which is achieved approximately by uncontaminated, in particular OH-free, fused silica plus a further contribution which correlates with the number of configurational degrees of freedom which "thaw" at $T_G$ and there show up as $c_p$ jump in a dynamic calorimetric measurement.

This number can be determined by topology methods and comparison with calorimetric measurements. Since each configurational change is a nonsimilarity image and therefore includes changes of atomic angles, the number of configurational degrees of freedom per mol follows the number of degrees of angular freedom per atom. The latter are calculated by the method described in DE 10 2014 119 594 A1, using the relationship reported in Alberto Garcia, Marvon Cohen, First Principles Ionicity Scales, Phys. Rev. B 1993, 4215-4220, for the degree of ionization of a cation-oxygen bond, which is incorporated herein by reference. The comparison of the result multiplied by the gas constant R with the $c_p$ jump at $T_G$ carried out on the example of various commercial glasses such as Borofloat33, Borofloat40, LF5, LLF1, K7, AF45, etc., justifies this procedure.

Since the glasses of the invention represent a combination of the constituent phases indicated above, it is sufficient for setting up the calculation method that the number of degrees of angular freedom per atom be indicated numerically for each constituent phase. The following may apply here:

TABLE 2

| Constituent phase | Formula (normalized to a simple oxide) | Number of atoms per structural unit | Number of degrees of angular freedom per atom |
|---|---|---|---|
| Albite | $(Na_2O \cdot Al_2O_3 \cdot 6SiO_2)/8$ | 26/8 | 0.318898019 |
| Reedmergnerite | $(Na_2O \cdot B_2O_3 \cdot 6SiO_2)/8$ | 26/8 | 0.235470229 |
| Potassium reedmergnerite | $(K_2O \cdot B_2O_3 \cdot 6SiO_2)/8$ | 26/8 | 0.238787725 |
| Grossular | $(3CaO \cdot Al_2O_3 \cdot 3SiO_2)/7$ | 20/7 | 0.666147023 |
| Cordierite | $(2MgO \cdot 2Al_2O_3 \cdot 5SiO_2)/9$ | 29/9 | 0.427525473 |
| Willemite | $(2ZnO \cdot SiO_2)/3$ | 7/3 | 0.725827911 |
| Silicon dioxide | $SiO_2$ | 3 | 0 |
| Diboron trioxide | $B_2O_3$ | 5 | 0.170590747 |
| Titanium wadeite | $(K_2O \cdot TiO_2 \cdot 3SiO_2)/5$ | 3 | 0.459052018 |
| Strontium feldspar | $(SrO \cdot Al_2O_3 \cdot 2SiO_2)/4$ | 13/4 | 0.501247171 |
| Celsian | $(BaO \cdot Al_2O_3 \cdot 2SiO_2)/4$ | 13/4 | 0.508110848 |

The calculation method for determining the degrees of angular freedom f per atom in the finished glass is therefore:

$$f = \frac{\sum_{i=1}^{n} c_i \cdot z_i \cdot f_i}{\sum_{i=1}^{n} c_i \cdot z_i}, \quad (1)$$

where $c_i$ is the mole fraction of the i-th constituent phase in the glass composition concerned, $z_i$ is the number of atoms per structural unit in the i-th constituent phase and $f_i$ is the number of degrees of angular freedom per atom in the i-th constituent phase. "n" is the number of constituent phases.

The position of the coefficient of thermal expansion in the desired range is likewise ensured by way of a calculation method. This is determined with reference to the average bond strength.

The coefficient of thermal expansion is inversely proportional to this (or to the "depth of the interatomic potential wells"). In a simple picture of oxidic glasses, the cations are in each case placed in a potential well formed by the surrounding oxygen atoms, and the depth of the potential well is considered to be the sum of the bond strengths of the various single bonds to the surrounding oxygen atoms, i.e. the total interaction energy is concentrated in potential wells with the cations in the centre and the oxygen atoms in the periphery. Thus, the reverse case no longer has to be considered; it would also be more difficult to analyse since an oxygen atom can be located between a number of different cations, which conversely cannot occur in purely oxidic glasses. These values have been tabulated, e.g. in DE 10 2014 119 594 A1:

TABLE 3

| Cation | Potential well depth/(kJ/mol) |
|---|---|
| Si | 1864 |
| B | 1572.5 |
| Al | 1537 |
| Li | 585 |
| Na | 440.5 |
| K | 395 |
| Mg | 999 |
| Ca | 1063 |

TABLE 3-continued

| Cation | Potential well depth/(kJ/mol) |
|---|---|
| Sr | 1005 |
| Ba | 976 |
| Zn | 728 |
| Ti | 1913 |

The values for Sr, Ba, Zn and Ti do not originate from DE 10 2014 119 594 A1, but have been calculated by precisely the same method described there using the sources cited there.

An average potential well depth can be calculated from the composition of a glass composed of the abovementioned constituent phases, the numbers of various cations present in the respective phase and the potential well depths per cation tabulated above:

$$\overline{E_{pot}} = \frac{\sum_{i=1}^{n} c_i \cdot \sum_{j=1}^{m} z_{i,j} \cdot E_{pot,j}}{\sum_{i=1}^{n} \sigma_j \cdot \sum_{j=1}^{m} z_{i,j}}, \quad (2)$$

Here, m is the number of cation types present, $E_{pot,j}$ is the potential well depth tabulated above for the j-th cation type and $z_{j,i}$ is the number of cations of the j-th type in the i-th constituent phase. The sums over j are tabulated below:

TABLE 4

| Constituent phase | $\sum_{j=1}^{m} z_{i,j}$ | $\sum_{j=1}^{m} z_{i,j} \cdot E_{pot,j}$ |
|---|---|---|
| Albite | 1.25 | 1892.38 |
| Reedmergnerite | 1.25 | 1901.25 |
| Potassium reedmergnerite | 1.25 | 1889.88 |
| Grossular | 1.14 | 1693.57 |
| Cordierite | 1.22 | 1940.67 |
| Willemite | 1.00 | 1106.67 |
| Silicon dioxide | 1.00 | 1864.00 |
| Diboron trioxide | 2.00 | 3145.00 |
| Titanium wadeite | 1.20 | 1659.00 |
| Strontium feldspar | 1.25 | 1951.75 |
| Celsian | 1.25 | 1944.50 |

This average bond strength is related, as a comparison with various commercial glasses such as Borofloat33, Borofloat40, AF45, AF32, etc. showed, to the coefficient of thermal expansion according to the following formula:

$$CTE = \left( \frac{51815 \left( \frac{kJ}{Mol} \right)}{E_{pot}} - 27.205 \right) \text{ppm/K}, \quad (3)$$

The selection of the constituent phases has been made since combinations of them display the desired ion exchange behaviour and the desired values for fragility and coefficient of expansion. The role of the individual constituent phases is once again presented in detail below.

Albite

A base glass which is representative of a constituent phase in the glass according to the present invention is albite glass. It is known that albite ($NaAlSi_3O_8$) has a high sodium diffusivity because of its structure made up of a framework of $SiO_4$ and $AlO_4$ tetrahedra with mobile sodium ions in the framework, see Geochimica and Cosmochimica Acta, 1963, Vol. 27, pages 107-120. A proportion of albite glass therefore contributes to a high sodium mobility, which promotes ion exchange and thus the chemical toughenability of the glasses. Compared to nepheline (synthetic variant without potassium: $NaAlSiO_4$) which has an even higher sodium diffusivity, albite has the advantage of a significantly lower melting point (1100-1120° C.), which improves the fusibility of the glass.

The arithmetic proportion of albite in the glasses of the present invention may be at least 10 mol % and not more than 40 mol %. An amount of albite which is too small impairs the ion exchangeability and chemical toughenability in respect of the replacement of sodium by potassium. The glass may contain albite in a proportion of at least 15 mol %, for example at least 18 mol % and for example at least 20 mol %. Pure albite glass would have an optimal chemical toughenability, but would not achieve the objective in respect of the required fragility. The number of degrees of angular freedom per atom in albite is 0.318898019 and thus more than the value desired for the glass of the present invention. Thus, albite can be used in a proportion of not more than 35 mol %, for example not more than 32 mol %, for example not more than 30 mol % and for example not more than 25 mol %. For the purposes of the invention, one mole of albite is one mole of $(Na_2O.Al_2O_3.6SiO_2)/8$.

Reedmergnerite

The boron analogue reedmergnerite has a significantly smaller number of degrees of angular freedom per atom than albite, namely 0.235470229. The glass of the invention therefore contains reedmergnerite glass as further base glass, for example, the glass contains more reedmergnerite than albite. This base glass is made up of $SiO_4$ and $BO_4$ tetrahedra in a manner analogous to albite glass, but with a more close-meshed structure because of the greater bond strength of the B—O bond compared to the Al—O bond. In addition, the B—O bond is more covalent than the Al—O bond. Both these facts result in firstly a smaller contribution to the fragility, but the mobile sodium atoms in the framework have, according to Anderson and Stuart (Journal of the American Ceramic Society, Vol. 37, No. 12, 573-580), a higher thermal enthalpy of activation than in albite glass, so that the contribution to sodium ion mobility at one and the same temperature is lower in reedmergnerite glass than in albite glass. According to the present invention, the glass described here may include at least 10 mol % of reedmergnerite, such as at least 15 mol % or at least 18 mol %, for example at least 20.5 mol % or at least 25 mol % and for example at least 30 mol % of reedmergnerite. To ensure a satisfactory toughenability, the amount of reedmergnerite is, however, restricted to not more than 65 mol %, for example not more than 60 mol %, for example not more than 45 mol %, for example not more than 40 mol % and for example not more than 35 mol %. For the purposes of the invention, one mole of reedmergnerite may one mole of ($Na_2O.B_2O_3.6SiO_2)/8$.

Potassium Reedmergnerite

To increase the devitrification stability, the potassium analogue of reedmergnerite can additionally also be added to the glass. In the case of such an addition, the finished glass contains not only sodium but also potassium as alkali and is therefore more stable to devitrification. As regards the number of degrees of angular freedom per atom, it behaves similarly to reedmergnerite; this number can be 0.238787725. This base glass will hereinafter be referred to as "potassium reedmergnerite" since it can be considered to be the potassium analogue of reedmergnerite having the danburite structure.

The glasses of the present invention can contain potassium reedmergnerite in a proportion of from 0 to 32 mol % or up to 30 mol %. With a view to the devitrification stability, some embodiments contain at least 1 mol % potassium reedmergnerite, for example at least 5 mol % or at least 8 mol %. In order not to impair the chemical toughenability, the amount of potassium reedmergnerite in the glass of the present invention may be restricted to not more than 25 mol %, for example not more than 20 mol % and for example not more than 15 mol %. For the purposes of the present invention, one mole of potassium reedmergnerite is one mole of $(K_2O.B_2O_3. 6SiO_2)/8$.

Some embodiments according to the present invention, the proportion of reedmergnerite in the glass can be greater than the proportion of potassium reedmergnerite, for example at least twice as high.

The total proportion of the abovementioned base glasses albite, reedmergnerite and potassium reedmergnerite in the glass of the present invention can be at least 50 mol %, for example at least 60 mol %. However, the proportion may be restricted to not more than 90 mol % and for example not more than 80 mol %. All three constituent phases presented above (albite, reedmergnerite, potassium reedmergnerite)

contain alkali metals in an appreciable amount, and these lead to a high thermal expansion. For this reason, further constituent phases in which alkaline earth metals or zinc, i.e. cations which lead to a moderate coefficient of expansion, are present instead of alkali metals are introduced.

Grossular, Cordierite and Willemite

The three further constituent phases grossular ($Ca_3Al_2Si_3O_{12}$), cordierite ($Mg_2Al_4Si_5O_{18}$) and willemite ($Zn_2SiO_4$) which are optionally present each have a high proportion of alkaline earth metals or zinc, so that their influence on the coefficient of expansion is considerable. Conversely, the respective number of angular conditions per atom can be very high (grossular: 0.666147023, cordierite: 0.427525473, willemite: 0.725827911).

The glasses of the present invention can therefore contain grossular in proportions of from 0 to 10 mol %, for example in amounts of up to 9 mol % or up to 8.5 mol %. In some embodiments, at least 1 mol %, for example at least 3 mol % and for example at least 5 mol %, of grossular is used. Some embodiments of the glasses of the present invention are free of grossular. For the purposes of the present invention, one mole of grossular can be one mole of ($3CaO.Al_2O_3.3SiO_2$)/7.

The glasses of the present invention can contain cordierite in proportions of from 0 to 10 mol %, for example in amounts of up to 8.5 mol % or not more than 5 mol %. In some embodiments, at least 1 mol %, for example at least 3 mol % and for example at least 4 mol %, of cordierite is used. Some embodiments of the glasses of the present invention are free of cordierite. For the purposes of the present invention, one mole of cordierite can be one mole of ($2MgO.2Al_2O_3.5SiO_2$)/9.

The glasses of the present invention can therefore contain willemite in proportions of from 0 to 15 mol %, for example in amounts of up to 10 mol %, for example up to 8.5 mol % or up to 7.5 mol %. In some embodiments, at least 0.5 mol %, for example at least 3 mol % and for example at least 5 mol %, of willemite is used. For the purposes of the present invention, one mole of willemite can be one mole of ($2ZnO.SiO_2$)/3.

In another embodiment, the sum of the proportions of grossular, cordierite and willemite in the glass of the invention can be at least 3 mol %, for example at least 4 mol % or at least 5 mol %, in order to influence the coefficient of expansion in the desired way. However, a total of not more than 25 mol %, for example not more than 20 mol %, not more than 15 mol % or not more than 10 mol %, of these base glasses can be used.

When it is said in the present description that the glasses are free of a component or of a constituent phase or do not contain a certain component or constituent phase, this is intended to mean that this component or constituent phase may be present at most as impurity in the glasses. This means that it is not added in significant amounts. Amounts which are not significant are, according to the present invention, amounts of less than 300 ppm (molar), such as less than 10 ppm (molar), less than 50 ppm (molar), or less than 10 ppm (molar). The glasses of the present invention can be free of lithium, lead, arsenic, antimony, bismuth and/or cadmium.

Silicon Dioxide and Diboron Trioxide

Finally, a proportion of a base glass composed of pure $SiO_2$ is also possible in order to set a low fragility. The glasses of the present invention can comprise $SiO_2$ as base glass in a proportion of at least 0 mol % and not more than 50 mol %, not more than 40 mol %, not more than 30 mol %, not more than 25 mol % or not more than 20 mol %. However, its content can be restricted to not more than 18 mol %, not more than 16 mol %, not more than 14 mol % or not more than 12 mol %. An excessively high proportion of silicon dioxide impairs the fusibility, so that some embodiments can contain less than 10 mol % of this component. It has been found that $SiO_2$ in amounts of at least 1 mol %, for example at least 3 mol % or at least 5 mol % can be used.

The proportion of silicon dioxide can be smaller than the respective proportion of reedmergnerite and/or albite. The molar ratio of the proportion of silicon dioxide to reedmergnerite and/or albite is even not more than 1:2, not more than 1:3, for example not more than 1:4. The limitation of the proportion of silicon dioxide is, for example, to be considered as due to the fact that the properties of the significant base glasses reedmergnerite and albite should predominate in the glass of the present invention.

A proportion of diboron trioxide also leads to a low fragility, although to a smaller degree than silicon dioxide but without influencing the fusibility. A proportion of from 0 mol % to 15 mol %, up to 12 mol % or up to 10 mol %, of diboron trioxide can therefore be provided. In some embodiments, the proportion of diboron trioxide is at least 1 mol % and for example not more than 5 mol % or not more than 3 mol %.

The sum of the proportions of silicon dioxide and diboron trioxide can be, according to the present invention, not more than 50 mol %, not more than 40 mol %, not more than 35 mol % or not more than 30 mol %, not more than 20 mol %, not more than 15 mol % and not more than 12.5 mol %.

Components which Increase the Index of Refraction

In order to replace window glass as optical cover glass, it may be necessary to set the index of refraction to a value of from 1.5 to 1.6, for example 1.523 (typical index of refraction of window glass at the sodium D line, see M. Rubin, Optical properties of soda lime silica glasses, Solar Energy Materials 12 (1985), 275-288). For this reason, up to three components containing heavy ions which increase the index of refraction are provided according to the invention: titanium wadeite (contains titanium), strontium feldspar (contains strontium), celsian (contains barium).

The proportion of titanium wadeite in the glass of the present invention can be from 0 mol % to 24 mol %. The content can be not more than 20 mol %, for example not more than 18 mol %. Some embodiments of the glasses of the present invention are free of titanium wadeite. However, other embodiments, the content of this component can be at least 1 mol %, at least 5 mol %, at least 10 mol % or even at least 13 mol %. For the purposes of the present invention, one mole of titanium wadeite is one mole of ($K_2O.TiO_2.3SiO_2$)/5. $TiO_2$ present in the glass increases the solarization resistance, which is particularly relevant in applications in which longevity is advantageous.

The proportion of strontium feldspar in the glass of the present invention can be from 0 mol % to 20 mol %. The content can be not more than 10 mol %, for example not more than 5 mol %. Some embodiments of the glasses of the present invention are free of strontium feldspar. However, in other embodiments, the content of this component can be at least 0.5 mol %, at least 1 mol %, at least 2 mol % or even at least 3 mol %. For the purposes of the present invention, one mole of strontium feldspar can be one mole of ($SrO.Al_2O_3.2SiO_2$)/4.

The proportion of celsian in the glass of the present invention can be from 0 mol % to 20 mol %. The proportion may be not more than 10 mol %, for example not more than 5 mol %. Some embodiments of the glasses of the present invention are free of celsian. However, in other embodiments, the content of this component can be at least 0.5 mol %, at least 1 mol %, at least 2 mol % or even at least 3 mol %. For the purposes of the present invention, one mole of celsian can be one mole of $(BaO.Al_2O_3.2SiO_2)/4$.

As a general rule for selection of an index of refraction in the range from 1.45 to 1.6, the method of Appen presented comprehensively in H. Bach, N. Neuroth, Properties of Optical Glass, second corrected printing, Schott-Series on Glass, Springer-Verlag Berlin Heidelberg New York (1998), pp. 73-76, including a precise description of the calculation method and the necessary parameters, is used. The abovementioned document of the Schott document series is incorporated in full into the disclosure of the present patent application. The original literature of Appen is cited in this document of the Schott document series.

Further Components

In addition to the abovementioned components, the glass can contain further constituents which are referred to as "balance" herein. The proportion of the balance in the glass of the invention can be not more than 5 mol %, in order not to disturb the glass properties set by careful selection of suitable base glasses. In some embodiments, the proportion of the balance in the glass is not more than 4 mol % or not more than 3 mol %, for example not more than 2 mol % or not more than 1 mol %. The balance may contain, oxides which are not present in the base glasses mentioned here. Thus, the balance may not contain any $SiO_2$, $TiO_2$, $B_2O_3$, $Al_2O_3$, ZnO, MgO, CaO, BaO, SrO, $Na_2O$ or $K_2O$. According to the invention, as balance, use is optionally made of additions of further simple oxides of "intermediates", i.e. oxides which are between the network formers such as $SiO_2$ and the network modifiers such as $Na_2O$ (see K. H. Sun, Journal of The American Ceramic Society Vol. 30, No. 9 (1947), pp. 277-281). Although these oxides alone do not form any glasses, they can be incorporated in the abovementioned percentage range into the network. Thus, the balance can contain, in particular, oxides such as $ZrO_2$. According to the theory of A. Dietzel, Die Kationenfeldstärken und ihre Beziehungen zu Entglasungsvorgängen, zur Verbindungsbildung und zu den Schmelzpunkten von Silicaten, Berichte der Bunsengesellschaft für physikalische Chemie Vol. 48 No. 1 (1942), 9-23, $Nb_2O_5$ and $Ta_2O_5$ also count as "intermediates", as can be calculated using the ionic radii according to R. Shannon, Revised Effective Ionic Radii and Systematic Studies of Interatomic Distances in Halides and Chalcogenides, Acta Cryst. (1976) A32, 751-767.

In another embodiment, the glass of the invention can be characterized by the following proportions of constituent phases in the base glass composition. The ranges of proportions indicated above and below and further features in respect of the glass of the invention also apply to the embodiment outlined below:

TABLE 5

| Constituent | Desired | | Particularly Desired | |
|---|---|---|---|---|
| phase | min. | max. | min. | max. |
| Albite | 15 mol % | 27 mol % | 18 mol % | 24 mol % |
| Reedmergnerite | 25 mol % | 38 mol % | 30 mol % | 35 mol % |
| Potassium reedmergnerite | 5 mol % | 20 mol % | 9 mol % | 13 mol % |
| Grossular | 0 mol % | 10 mol % | 0 mol % | 3 mol % |
| Cordierite | 0 mol % | 10 mol % | 0 mol % | 3 mol % |
| Willemite | 0 mol % | 10 mol % | 4 mol % | 9 mol % |
| Silicon dioxide | 0 mol % | 12 mol % | 7 mol % | 10 mol % |
| Diboron trioxide | 0 mol % | 8 mol % | >0 mol % | 5 mol % |
| Titanium wadeite | 5 mol % | 24 mol % | 12 mol % | 20 mol % |
| Strontium feldspar | 0 mol % | 10 mol % | 0 mol % | 3 mol % |
| Celsian | 0 mol % | 10 mol % | 0 mol % | 3 mol % |
| Optional balance | 0 mol % | 5 mol % | 0 mol % | 5 mol % |

In another embodiment, the glass of the invention can be characterized by the following proportions of constituent phases in the base glass composition. The ranges of proportions indicated above and below and further features in respect of the glass of the invention also apply to the embodiment outlined below:

TABLE 6

| Constituent | Desired | | Particularly Desired | |
|---|---|---|---|---|
| phase | min. | max. | min. | max. |
| Albite | 15 mol % | 27 mol % | 18 mol % | 24 mol % |
| Reedmergnerite | 40 mol % | 65 mol % | 50 mol % | 62 mol % |
| Potassium reedmergnerite | 0 mol % | 15 mol % | 0 mol % | 5 mol % |
| Grossular | 1 mol % | 10 mol % | 5 mol % | 9 mol % |
| Cordierite | 0 mol % | 10 mol % | 0 mol % | 3 mol % |
| Willemite | 0 mol % | 10 mol % | >0 mol % | 3 mol % |
| Silicon dioxide | 0 mol % | 20 mol % | 6 mol % | 14 mol % |
| Diboron trioxide | 0 mol % | 10 mol % | >0 mol % | 5 mol % |
| Titanium wadeite | 0 mol % | 10 mol % | 0 mol % | 3 mol % |
| Strontium feldspar | 0 mol % | 10 mol % | 0 mol % | 3 mol % |
| Celsian | 0 mol % | 10 mol % | 0 mol % | 3 mol % |
| Optional balance | 0 mol % | 5 mol % | 0 mol % | 5 mol % |

Other Glass Properties

The glass of the present invention can be present as glass product, for example glass sheet or glass plate, having a thickness of not more than 2 mm, for example not more than 1 mm, not more than 500 µm, not more than 250 µm, not more than 150 µm or not more than 100 µm. The glass of the present invention can be processed to produce a thin glass or ultra-thin glass. Particularly thin glasses are sometimes chemically toughenable only with difficulty, so that the high hardness which the glasses of the invention have even without toughening can be desired in the case of thin glasses.

Owing to the combination of the phases constituting the glass, the glasses of the present invention display a thermal expansion (also: CTE) of not more than 8 ppm/K, for example not more than 7.5 ppm/K, which is advantageous for many applications. The abovementioned coefficient of expansion can be an, in embodiment, at least 4 ppm/K or at least 5 ppm/K. The thermal expansion can be calculated as described above in formula (3).

Owing to its substantial proportion of albite glass, the glass may have a chemical toughenability characterized by a threshold diffusivity of at least 15 µm²/h or at least 20 µm²/h at a temperature of 450° C. in $KNO_3$. The threshold diffusivity is a measure of the rate at which potassium ions are incorporated into the glass during chemical toughening.

The threshold diffusivity is calculated from the depth of the compressive stress layer (DoL) and the time (t), as explained in DE 20 2012 012 876 U1.

Embodiment 1: 6.5 ppm/K<CTE<8 ppm/K

In one embodiment, the glass of the invention has a CTE in the range from 6.5 ppm/K to 8 ppm/K. The conformity of a glass to this embodiment is ensured by fulfilment of the above inequation and application of the abovementioned formula (3). In this embodiment, the glass is especially, but not exclusively, provided for a combination with aluminium oxide ceramics. An example of such a structure is described in U.S. Pat. No. 6,109,994. There, a glass covering sheet closes off a field emission display structure to which a column construction composed of aluminium oxide belongs. The high CTE cannot be combined with a very low fragility, but the number of degrees of angular freedom per atom calculated according to the abovementioned formula (1) should be <0.30, for example <0.29, <0.28, <0.27, <0.26, or <0.25. In particular, the number of degrees of angular freedom per atom can be at least 0.1.

Embodiment 2: 4.5 ppm/K<CTE<6.5 ppm/K

In one embodiment, the glass of the invention has a CTE in the range from 4.5 ppm/K to 6.5 ppm/K. The conformity of a glass to this embodiment is ensured by the fulfilment of the above inequation and application of the abovementioned formula (3). In this embodiment, the glass is especially, but not exclusively, provided for a combination with aluminium nitride, see, for example, C. K. Lee, S. Cochran, A. Abrar, K. J. Kirk, F. Placido, Thick aluminium nitride films deposited by room-temperature sputtering for ultrasonic applications, Ultrasonics 42 (2004) 485-490. The number of degrees of angular freedom per atom calculated according to the abovementioned formula (1) should be <0.30, for example <0.29, <0.28, <0.27, <0.26, <0.25, <0.24, <0.23, <0.22, <0.21, or <0.20. In particular, the number of degrees of angular freedom per atom can be at least 0.1.

Embodiment 3: 3.5 ppm/K<CTE<4.5 ppm/K

In one embodiment, the glass of the invention has a CTE in the range from 3.5 ppm/K to 4.5 ppm/K. The conformity of a glass to this embodiment is ensured by the fulfilment of the above inequation and application of the abovementioned formula (3). In this embodiment, the glass is especially, but not exclusively, provided for a combination with silicon or silicon-based components. Glasses having a thermal expansion in this range are often bonded to silicon or silicon-based components, see, for example, F. Saharil, R. V. Wright, P. Rantakari, P. B. Kirby, T. Vaha-Heikkila, F. Niklaus, G. Stemme, J. Oberhammer, "Low-temperature CMOS-compatible 3D-integration of monocrystalline-silicon based PZT RF MEMS switch actuators on rf substrates", 2010 IEEE 23rd International Conference on Micro Electro Mechanical Systems (MEMS), 2010, pp. 47-50. The number of degrees of angular freedom per atom calculated according to the abovementioned formula (1) should be <0.30, for example <0.29, <0.28, <0.27, <0.26, <0.25, <0.24, <0.23, <0.22, <0.21, <0.20, <0.19, <0.18, <0.17, <0.16, or <0.15. In particular, the number of degrees of angular freedom per atom can be at least 0.1.

In the case of the glasses of the present invention, the number of degrees of angular freedom per atom in the bulk glass is, for example, less than 0.30, less than 0.29, less than 0.28, less than 0.27, less than 0.26, less than 0.25, less than 0.24, than 0.23, than 0.22, than 0.21, than 0.20, less than 0.19, less than 0.18, less than 0.17, less than 0.16, or less than 0.15. If it is ensured that the number of degrees of angular freedom per atom does not exceed this value, the fragility remains in a desired range. In particular, this value can be advantageous in order to make it possible to produce ultra-thin glass articles, too. In particular, the number of degrees of angular freedom per atom can be at least 0.1.

Production Process

The present invention also provides a process for producing a glass according to the present invention, including the steps:

melting of the glass raw materials,
moulding of a glass article, in particular a glass sheet or a glass plate, from the glass melt,
cooling of the glass.

Cooling can be carried out by active cooling using a coolant, e.g. a cooling fluid, or by allowing the glass to cool passively.

In one embodiment, the moulding of the glass article takes place in a down draw, overflow fusion or redrawing process. In these sheet glass processes, glasses having the desired very small thickness can be produced. Furthermore, these processes may have the advantage that high cooling rates can be achieved.

The choice of raw materials is not restricted to particular raw materials. In particular, it is not necessary to use the abovementioned base glasses as raw materials for these glasses, even though this would be possible in principle. Rather, the critical factor is that the raw materials be used in the suitable stoichiometric composition so that the base glasses are present stoichiometrically in the glass.

Surface Properties

The glasses of the present invention may have a property gradient between the bulk glass and the surface of a glass article produced from the glass. A glass article made of the glass described herein is likewise part of the present invention.

For the purposes of the invention, a "surface" can be a proportion of the glass which is close to the glass/air interface. The glass forming the surface will here be referred to as "surface glass"; the remaining glass located further in the interior will here be referred to as "bulk glass". A precise demarcation between surface and bulk is difficult; therefore, it is specified for the purposes of the present invention that the surface glass is present in a depth of about 6 nm. The properties of the surface glass are consequently determined at a depth of about 6 nm. The properties of the bulk glass are determined by calculation since the glass composition at a greater depth does not experience any change as a result of production. Bulk glass is in any case present at a depth of 500 nm. The surface can be advantageously influenced by particular measures during glass production. The properties of the surface glass are critical for particular properties of the glass which are measured on the surface. These include, for example, the base resistance and the hydrolytic resistance. The composition of the surface glass at a depth of about 6 nm can be measured by Cs-TOF-SIMS at 1000 eV.

It has been found that the loss of surface material occurring during production of the glasses of the invention relates mostly to sodium and boron. In the glass of the invention, sodium can be assigned to the reedmergnerite and the albite. Boron in the glass of the invention can be assigned either to reedmergnerite or potassium reedmergnerite or is present as separate constituent phase $B_2O_3$. It has also been found that, in contrast to the loss of sodium, boron and other constituents, a relative enrichment of the surface in silicon takes place. However, this is desirable only within limits.

According to DE 10 2014 101 756 B4, the surface depletion of sodium ions can be advantageous for the hydrolytic stability. At the same time, this depletion also has an effect on the fragility and the number of degrees of angular freedom and the coefficient of thermal expansion. The latter becomes particularly clear when the abovementioned formula (2) for the average potential well depth is reformulated so that the relationship to the normalized proportions $d_j/\Sigma d_j$ of the individual cations is made clear:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} = \quad (4)$$

$$\frac{\sum_{j=1}^{m}\left(\sum_{i=1}^{n} c_i \cdot z_{i,j}\right) \cdot E_{pot,j}}{\sum_{j=1}^{m}\left(\sum_{i=1}^{n} c_i \cdot z_{i,j}\right)} = \frac{\sum_{j=1}^{m} d_j \cdot E_{pot,j}}{\sum_{j=1}^{m} d_j}$$

where $d_j = \left(\sum_{i=1}^{n} c_i \cdot z_{i,j}\right)$.

The calculation of the average potential well depth obviously leads to a higher value in the surface region when the proportion of cations having a low potential well depth as per Table 3 decreases there. This means a lower coefficient of thermal expansion at the surface and thus different coefficients of expansion in the interior and at the surface.

Due to the hot forming to which the glass of the present invention can be subjected, changes in the glass composition occur at the surface. This change leads to a deviation of the thermal expansion in the surface glass from that of the bulk glass. As a result of the composition and in combination with aspects of the production process, it is possible according to the invention for the glass of the invention to have a thermal expansion (CTE) calculated according to formula (4) from the composition measured by Cs-TOF-SIMS at the surface, at a depth of about 6 nm, which is at least 50%, at least 60%, at least 70% or at least 80%, of the thermal expansion in the bulk glass. From the standpoint of the hydrolytic stability, the thermal expansion calculated according to formula (4) at the surface, at a depth of about 6 nm, can be not more than 99%, for example not more than 98% or not more than 95%, compared to that in the bulk glass. The values can, be measured immediately after production of the glass.

The loss of particular glass components at the surface of the glass and thus also the thermal expansion is dependent not only on the glass composition but also on the production process. In particular, the loss of free $B_2O_3$ can be set by setting the partial pressure of water vapour during moulding of a glass article. More diboron trioxide vaporizes in the form of metaboric acid at a higher partial pressure of water vapour. Likewise, the thermal expansion in the surface glass can also be influenced by increasing the drawing speed and reducing the partial pressure of water vapour. A person skilled in the art is therefore able to set the desired properties.

The glass of the present invention can be present in the form of a glass article, for example in the form of a sheet glass or a glass plate, and have at least one fire-polished surface, for example two fire-polished surfaces. A "fire-polished surface" is a surface which has a particularly low roughness. The production processes of the invention make it possible to produce glass products which have particular surface qualities. The glass products have at least one fire-polished surface, for example two fire-polished surfaces, due to the production processes by which they can be obtained. In contrast to mechanical polishing, a surface is not ground in the case of fire polishing, but instead the material to be polished is heated to such a temperature that it flows and becomes smooth. The costs of producing a smooth surface by fire polishing are therefore significantly lower than for producing a mechanically polished surface. The roughness of a fire-polished surface is lower than that of a mechanically polished surface. In relation to a shaped glass article, "surfaces" mean the upper side or underside, i.e. the two sides which are largest compared to the remaining sides.

The fire-polished surface(s) of the glasses of the present invention can have a quadratic roughness (Rq or also RMS) of not more than 5 nm, for example not more than 3 nm or not more than 1 nm. The peak-to-valley height Rt of the glasses can be not more than 6 nm, not more than 4 nm, and not more than 2 nm. The peak-to-valley height is determined in accordance with DIN EN ISO 4287. The roughness Ra can be less than 1 nm according to the invention.

In the case of mechanically polished surfaces, the roughness values are poorer. In addition, polishing tracks can be discerned under an atomic force microscope (AFM) in the case of mechanically polished surfaces. Furthermore, residues of the mechanical polishing agent, e.g. diamond powder, iron oxide and/or $CeO_2$, can likewise be discerned under the AFM. Since mechanically polished surfaces always have to be cleaned after polishing, particular ions are leached from the surface of the glass. This depletion in particular ions can be confirmed by secondary ion mass spectrometry (ToF-SIMS). Such ions are, for example, Ca, Zn, Ba and alkali metals.

Use

The invention also provides for the use of a glass according to the present invention as covering glass or display glass, substrate glass, especially for metallic conduits, or as electrically insulating dielectric intermediate layer, especially as interposer, e.g. in an electronic or optoelectronic appliance, or as polymer replacement in the finishing of surfaces.

EXAMPLES

A composition indicated in terms of base glasses can easily be converted into a composition in mol % by a matrix. The composition in terms of base glasses can be, as above, reported in the following normalized form:

TABLE 7

| Constituent phase | Formula (normalized to a simple oxide) |
| --- | --- |
| Albite | $(Na_2O \cdot Al_2O_3 \cdot 6SiO_2)/8$ |
| Reedmergnerite | $(Na_2O \cdot B_2O_3 \cdot 6SiO_2)/8$ |
| Potassium reedmergnerite | $(K_2O \cdot B_2O_3 \cdot 6SiO_2)/8$ |
| Grossular | $(3CaO \cdot Al_2O_3 \cdot 3SiO_2)/7$ |
| Cordierite | $(2MgO \cdot 2Al_2O_3 \cdot 5SiO_2)/9$ |
| Willemite | $(2ZnO \cdot SiO_2)/3$ |
| Silicon dioxide | $SiO_2$ |

TABLE 7-continued

| Constituent phase | Formula (normalized to a simple oxide) |
|---|---|
| Diboron trioxide | $B_2O_3$ |
| Titanium wadeite | $(K_2O \cdot TiO_2 \cdot 3SiO_2)/5$ |
| Strontium feldspar | $(SrO \cdot Al_2O_3 \cdot 2SiO_2)/4$ |
| Celsian | $(BaO \cdot Al_2O_3 \cdot 2SiO_2)/4$ |

The conversion of these compositions into a composition in mol % of the following simple oxides

TABLE 8

| # | Oxide |
|---|---|
| 1. | $SiO_2$ |
| 2. | $TiO_2$ |
| 3. | $B_2O_3$ |
| 4. | $Al_2O_3$ |
| 5. | ZnO |
| 6. | MgO |
| 7. | CaO |
| 8. | SrO |
| 9. | BaO |
| 10. | $Na_2O$ |
| 11. | $K_2O$ |

... can be carried out with the aid of the matrix indicated below. Here, the composition in mol % of the base glasses is multiplied as column vector from the right onto the matrix:

| 6/8 | 6/8 | 6/8 | 3/7 | 5/9 | 1/3 | 1 | 0 | 3/5 | 2/4 | 2/4 |
|---|---|---|---|---|---|---|---|---|---|---|
| 0 | 0 | 0 | 0 | 0 | 0 | 0 | 0 | 1/5 | 0 | 0 |
| 0 | 1/8 | 1/8 | 0 | 0 | 0 | 0 | 1 | 0 | 0 | 0 |
| 1/8 | 0 | 0 | 1/7 | 2/9 | 0 | 0 | 0 | 0 | 1/4 | 1/4 |
| 0 | 0 | 0 | 0 | 0 | 2/3 | 0 | 0 | 0 | 0 | 0 |
| 0 | 0 | 0 | 0 | 2/9 | 0 | 0 | 0 | 0 | 0 | 0 |
| 0 | 0 | 0 | 3/7 | 0 | 0 | 0 | 0 | 0 | 0 | 0 |
| 0 | 0 | 0 | 0 | 0 | 0 | 0 | 0 | 0 | 1/4 | 0 |
| 0 | 0 | 0 | 0 | 0 | 0 | 0 | 0 | 0 | 0 | 1/4 |
| 1/8 | 1/8 | 0 | 0 | 0 | 0 | 0 | 0 | 0 | 0 | 0 |
| 0 | 0 | 1/8 | 0 | 0 | 0 | 0 | 0 | 1/5 | 0 | 0 |

×

| $(Na_2O \cdot Al_2O_3 \cdot 6SiO_2)/8$ |
| $(Na_2O \cdot B_2O_3 \cdot 6SiO_2)/8$ |
| $(K_2O \cdot B_2O_3 \cdot 6SiO_2)/8$ |
| $(3CaO \cdot Al_2O_3 \cdot 3SiO_2)/7$ |
| $(2MgO \cdot 2Al_2O_3 \cdot 5SiO_2)/9$ |
| $(2ZnO \cdot SiO_2)/3$ |
| $SiO_2$ |
| $B_2O_3$ |
| $(K_2O \cdot TiO_2 \cdot 3SiO_2)/5$ |
| $(SrO \cdot Al_2O_3 \cdot 2SiO_2)/4$ |
| $(BaO \cdot Al_2O_3 \cdot 2SiO_2)/4$ |

The result of the multiplication of the column vector onto the matrix gives the composition of the glass in mol %.

Conversely, a composition in mol % can be converted simply into a base glass composition via the respective inverse matrix. Here, naturally only those base glass compositions which on conversion do not give any negative values for the base glasses are according to the invention.

Glasses According to the Present Invention

As a first example, a glass having the following composition will be examined:

Example 1

TABLE 9

| Constituent phase | Formula (normalized to a simple oxide) | Proportion/mol % |
|---|---|---|
| Albite | $(Na_2O \cdot Al_2O_3 \cdot 6SiO_2)/8$ | 21.5719 |
| Reedmergnerite | $(Na_2O \cdot B_2O_3 \cdot 6SiO_2)/8$ | 32.9332 |
| Potassium reedmergnerite | $(K_2O \cdot B_2O_3 \cdot 6SiO_2)/8$ | 11.9446 |
| Grossular | $(3CaO \cdot Al_2O_3 \cdot 3SiO_2)/7$ | 0 |
| Cordierite | $(2MgO \cdot 2Al_2O_3 \cdot 5SiO_2)/9$ | 0 |
| Willemite | $(2ZnO \cdot SiO_2)/3$ | 6.52253 |
| Silicon dioxide | $SiO_2$ | 8.28669 |
| Diboron trioxide | $B_2O_3$ | 2.28438 |
| Titanium wadeite | $(K_2O \cdot TiO_2 \cdot 3SiO_2)/5$ | 16.4505 |
| Strontium feldspar | $(SrO \cdot Al_2O_3 \cdot 2SiO_2)/4$ | 0 |
| Celsian | $(BaO \cdot Al_2O_3 \cdot 2SiO_2)/4$ | 0 |

This glass has the following properties:
1. The number of degrees of angular freedom per atom calculated according to (1) is thus 0.291.
2. The average potential well depth calculated according to (2) is 1499 kJ/mol, which in turn leads according to (3) to a thermal expansion of 7.4 ppm/K.

Replacing 8 percent of potassium reedmergnerite by albite gives a second illustrative glass. This may increase the chemical toughenability.

Example 2

TABLE 10

| Constituent phase | Formula (normalized to a simple oxide) | Proportion/mol % |
|---|---|---|
| Albite | $(Na_2O \cdot Al_2O_3 \cdot 6SiO_2)/8$ | 29.5719 |
| Reedmergnerite | $(Na_2O \cdot B_2O_3 \cdot 6SiO_2)/8$ | 32.9332 |
| Potassium reedmergnerite | $(K_2O \cdot B_2O_3 \cdot 6SiO_2)/8$ | 3.9446 |
| Grossular | $(3CaO \cdot Al_2O_3 \cdot 3SiO_2)/7$ | 0 |
| Cordierite | $(2MgO \cdot 2Al_2O_3 \cdot 5SiO_2)/9$ | 0 |
| Willemite | $(2ZnO \cdot SiO_2)/3$ | 6.52253 |
| Silicon dioxide | $SiO_2$ | 8.28669 |
| Diboron trioxide | $B_2O_3$ | 2.28438 |
| Titanium wadeite | $(K_2O \cdot TiO_2 \cdot 3SiO_2)/5$ | 16.4505 |
| Strontium feldspar | $(SrO \cdot Al_2O_3 \cdot 2SiO_2)/4$ | 0 |
| Celsian | $(BaO \cdot Al_2O_3 \cdot 2SiO_2)/4$ | 0 |

This glass has the following properties:
1. The number of degrees of angular freedom per atom calculated according to (1) is thus 0.298.
2. The average potential well depth calculated according to (2) has, as in Example 1, a value of 1499 kJ/mol, which in turn leads according to (3) to a thermal expansion of 7.4 ppm/K.

Example 1 and Example 2 have been produced as experimental melts. It was to be determined how the glass can be chemically toughened. The samples were toughened once at 440° C. and once at 450° C. for 9 hours in $KNO_3$.

Glass plates (30 mm×30 mm×1 mm) were produced from the experimental melts. To homogenize the surfaces, the samples were precleaned for 3 minutes in 1% 12PA (mild alkaline cleaner) in an ultrasonic bath at 37 kHz. The samples were treated at 440° C. and 450° C. for 9 hours in KNO$_3$. After ion exchange, the samples have to be freed of the potassium nitrate salt. For this purpose, the samples were cleaned for 5 minutes in 1% 12PA at 130 kHz and subsequently rinsed with DI water.

The compressive stress (CS) and the depth of the compressive stress layer (DoL) were measured on the plates. The measurement of the compressive strength and the depth of layer were carried out on a surface stress meter.

On each sample, CS and DoL were measured three times at the middle on each side. The tables show mean and standard deviation for the experimental melts measured.

440° C., 9 h:

|  |  | Mean | | Standard deviation | |
|---|---|---|---|---|---|
|  |  | CS [MPa] | DoL [μm] | CS [MPa] | DoL [μm] |
| Example 1 | Sample 1 | 496.5 | 24.8 | 6.8 | 0.5 |
|  | Sample 2 | 492.7 | 25.3 | 6.5 | 1.0 |
| Example 2 | Sample 1 | 556.7 | 25.8 | 7.9 | 0.6 |
|  | Sample 2 | 558.7 | 26.0 | 5.9 | 0.2 |

450° C., 9 h:

|  |  | Mean | | Standard deviation | |
|---|---|---|---|---|---|
|  |  | CS [MPa] | DoL [μm] | CS [MPa] | DoL [μm] |
| Example 1 | Sample 1 | 476.3 | 28.4 | 4.2 | 1.4 |
|  | Sample 2 | 476.5 | 29.4 | 3.2 | 0.3 |
| Example 2 | Sample 1 | 535.2 | 28.9 | 3.7 | 0.5 |
|  | Sample 2 | 536.6 | 29.3 | 2.7 | 0.8 |

The examples were configured as cast blocks. In the case of production by drawing, the partial pressure of water vapour is set so that the total boron content at the surface is not less than 80% of the boron content in the interior of the glass.

Example 3

TABLE 11

| Constituent phase | Formula (normalized to a simple oxide) | Proportion/mol % |
|---|---|---|
| Albite | (Na$_2$O•Al$_2$O$_3$•6SiO$_2$)/8 | 30 |
| Reedmergnerite | (Na$_2$O•B$_2$O$_3$•6SiO$_2$)/8 | 30 |
| Potassium reedmergnerite | (K$_2$O•B$_2$O$_3$•6SiO$_2$)/8 | 20 |
| Grossular | (3CaO•Al$_2$O$_3$•3SiO$_2$)/7 | 0 |
| Cordierite | (2MgO•2Al$_2$O$_3$•5SiO$_2$)/9 | 0 |
| Willemite | (2ZnO•SiO$_2$)/3 | 0 |
| Silicon dioxide | SiO$_2$ | 5 |
| Diboron trioxide | B$_2$O$_3$ | 10 |
| Titanium wadeite | (K$_2$O•TiO$_2$•3SiO$_2$)/5 | 5 |
| Strontium feldspar | (SrO•Al$_2$O$_3$•2SiO$_2$)/4 | 0 |
| Celsian | (BaO•Al$_2$O$_3$•2SiO$_2$)/4 | 0 |

This glass has the following properties:
1. The number of degrees of angular freedom per atom calculated according to (1) is thus 0.25.
2. The thermal expansion calculated according to (2) and (3) is 6.62 ppm/K.

Example 4

TABLE 12

| Constituent phase | Formula (normalized to a simple oxide) | Proportion/mol % |
|---|---|---|
| Albite | (Na$_2$O•Al$_2$O$_3$•6SiO$_2$)/8 | 30 |
| Reedmergnerite | (Na$_2$O•B$_2$O$_3$•6SiO$_2$)/8 | 10 |
| Potassium reedmergnerite | (K$_2$O•B$_2$O$_3$•6SiO$_2$)/8 | 5 |
| Grossular | (3CaO•Al$_2$O$_3$•3SiO$_2$)/7 | 0 |
| Cordierite | (2MgO•2Al$_2$O$_3$•5SiO$_2$)/9 | 0 |
| Willemite | (2ZnO•SiO$_2$)/3 | 0 |
| Silicon dioxide | SiO$_2$ | 35 |
| Diboron trioxide | B$_2$O$_3$ | 10 |
| Titanium wadeite | (K$_2$O•TiO$_2$•3SiO$_2$)/5 | 10 |
| Strontium feldspar | (SrO•Al$_2$O$_3$•2SiO$_2$)/4 | 0 |
| Celsian | (BaO•Al$_2$O$_3$•2SiO$_2$)/4 | 0 |

This glass has the following properties:
1. The number of degrees of angular freedom per atom calculated according to (1) is thus 0.196.
2. The thermal expansion calculated according to (2) and (3) is 4.96 ppm/K.

Example 5

TABLE 13

| Constituent phase | Formula (normalized to a simple oxide) | Proportion/mol % |
|---|---|---|
| Albite | (Na$_2$O•Al$_2$O$_3$•6SiO$_2$)/8 | 35 |
| Reedmergnerite | (Na$_2$O•B$_2$O$_3$•6SiO$_2$)/8 | 10 |
| Potassium reedmergnerite | (K$_2$O•B$_2$O$_3$•6SiO$_2$)/8 | 10 |
| Grossular | (3CaO•Al$_2$O$_3$•3SiO$_2$)/7 | 0 |
| Cordierite | (2MgO•2Al$_2$O$_3$•5SiO$_2$)/9 | 5 |
| Willemite | (2ZnO•SiO$_2$)/3 | 0 |
| Silicon dioxide | SiO$_2$ | 35 |
| Diboron trioxide | B$_2$O$_3$ | 5 |
| Titanium wadeite | (K$_2$O•TiO$_2$•3SiO$_2$)/5 | 0 |
| Strontium feldspar | (SrO•Al$_2$O$_3$•2SiO$_2$)/4 | 0 |
| Celsian | (BaO•Al$_2$O$_3$•2SiO$_2$)/4 | 0 |

This glass has the following properties:
1. The number of degrees of angular freedom per atom calculated according to (1) is thus 0.193.
2. The thermal expansion calculated according to (2) and (3) is 4.67 ppm/K.

Example 6

TABLE 14

| Constituent phase | Formula (normalized to a simple oxide) | Proportion/mol % |
|---|---|---|
| Albite | (Na$_2$O•Al$_2$O$_3$•6SiO$_2$)/8 | 30 |
| Reedmergnerite | (Na$_2$O•B$_2$O$_3$•6SiO$_2$)/8 | 30 |
| Potassium reedmergnerite | (K$_2$O•B$_2$O$_3$•6SiO$_2$)/8 | 5 |
| Grossular | (3CaO•Al$_2$O$_3$•3SiO$_2$)/7 | 0 |
| Cordierite | (2MgO•2Al$_2$O$_3$•5SiO$_2$)/9 | 0 |
| Willemite | (2ZnO•SiO$_2$)/3 | 10 |
| Silicon dioxide | SiO$_2$ | 10 |
| Diboron trioxide | B$_2$O$_3$ | 10 |
| Titanium wadeite | (K$_2$O•TiO$_2$•3SiO$_2$)/5 | 5 |
| Strontium feldspar | (SrO•Al$_2$O$_3$•2SiO$_2$)/4 | 0 |
| Celsian | (BaO•Al$_2$O$_3$•2SiO$_2$)/4 | 0 |

This glass has the following properties:
1. The number of degrees of angular freedom per atom calculated according to (1) is thus 0.274.

2. The thermal expansion calculated according to (2) and (3) is 7.01 ppm/K.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, having a composition which is characterized by the following constituent phases:

| A constituent phase | min. | max. |
|---|---|---|
| Albite | 10 mol % | 40 mol % |
| Reedmergnerite | 10 mol % | 65 mol % |
| Potassium reedmergnerite | 0 mol % | 32 mol % |
| Grossular | 0 mol % | 10 mol % |
| Cordierite | 0 mol % | 10 mol % |
| Willemite | 0 mol % | 15 mol % |
| Silicon dioxide | 0 mol % | 50 mol % |
| Diboron trioxide | 0 mol % | 15 mol % |
| Titanium wadeite | 0 mol % | 24 mol % |
| Strontium feldspar | 0 mol % | 20 mol % |
| Celsian | 0 mol % | 20 mol % | wherein a number of degrees of angular freedom per atom is calculated according to a formula:

$$f = \frac{\sum_{i=1}^{n} c_i \cdot z_i \cdot f_i}{\sum_{i=1}^{n} c_i \cdot z_i}, \quad (1)$$

wherein f is the number of degrees of angular freedom per atom, $c_i$ is a mole fraction of the i-th constituent phase, $z_i$ is a number of atoms per structural unit in the i-th constituent phase, $f_i$ is a number of degrees of angular freedom per atom in the i-th constituent phase, and "n" is a number of constituent phases, such that said number of degrees of angular freedom per atom is not more than 0.29, wherein a coefficient of thermal expansion is calculated according to formulae:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \quad (2)$$

wherein $E_{pot}$ is an average potential well depth, m is a number of cation types present, $E_{pot,j}$ is a potential well depth for a j-th cation type, $z_{j,i}$ is a number of cations of the j-th type in an i-th constituent phase, $c_i$ is a mole fraction of the i-th constituent phase, and "n" is a number of constituent phases; and $$CTE = \left( \frac{51815\left(\frac{kJ}{Mol}\right)}{\overline{E_{pot}}} - 27.205 \right) \text{ppm/K}, \quad (3)$$

wherein CTE is the thermal coefficient of thermal expansion, such that said coefficient of thermal expansion is from 7.01 ppm/K to 8 ppm/K.

2. The glass according to claim 1, wherein said glass has an average thickness of not more than 2 mm.

3. The glass according to claim 1, wherein said glass has a composition which is characterized by the following constituent phases:

| Constituent phase | min. | max. |
|---|---|---|
| Albite | 15 mol % | 27 mol % |
| Reedmergnerite | 25 mol % | 38 mol % |
| Potassium reedmergnerite | 5 mol % | 20 mol % |
| Grossular | 0 mol % | 10 mol % |
| Cordierite | 0 mol % | 10 mol % |
| Willemite | 0 mol % | 10 mol % |
| Silicon dioxide | 0 mol % | 12 mol % |
| Diboron trioxide | 0 mol % | 8 mol % |
| Titanium wadeite | 5 mol % | 24 mol % |
| Strontium feldspar | 0 mol % | 10 mol % |
| Celsian | 0 mol % | 10 mol % |

4. The glass according to claim 1, wherein said glass has a composition which is characterized by the following constituent phases:

| Constituent phase | min. | max. |
|---|---|---|
| Albite | 15 mol % | 27 mol % |
| Reedmergnerite | 40 mol % | 65 mol % |
| Potassium reedmergnerite | 0 mol % | 15 mol % |
| Grossular | 1 mol % | 10 mol % |
| Cordierite | 0 mol % | 10 mol % |
| Willemite | 0 mol % | 10 mol % |
| Silicon dioxide | 0 mol % | 20 mol % |
| Diboron trioxide | 0 mol % | 10 mol % |
| Titanium wadeite | 0 mol % | 10 mol % |
| Strontium feldspar | 0 mol % | 10 mol % |
| Celsian | 0 mol % | 10 mol % |

5. The glass according to claim 1, wherein a sum of the proportions of reedmergnerite and potassium reedmergnerite in said glass is greater than a proportion of albite.

6. The glass according to claim 1, wherein at least one of a proportion of reedmergnerite and a proportion of albite is greater than a proportion of silicon dioxide.

7. The glass according to claim 1, wherein the glass further includes a balance of further constituents which does not exceed a proportion of 5 mol %, and said balance contains oxides that are not present in the constituent phases.

8. The glass according to claim 7, wherein said proportion of said balance is not more than 2 mol % of said glass.

9. The glass according to claim 1, wherein a proportion of willemite is at least 0.5 mol % and not more than 7.5 mol %.

10. The glass according to claim 1, wherein a proportion of reedmergnerite is greater than a proportion of potassium reedmergnerite.

11. The glass according to claim 1, wherein the coefficient of thermal expansion calculated according to formulae (2) and (3) in a surface glass corresponds to at least 50% of the coefficient of thermal expansion calculated according to formulae (2) and (3) in a bulk glass, wherein the surface glass is present in a depth of about 6 nm.

12. The glass according to claim 1, wherein the coefficient of thermal expansion calculated according to formulae (2) and (3) in a surface glass corresponds to not more than 99% of the coefficient of thermal expansion calculated according to formulae (2) and (3) in a bulk glass, wherein the surface glass is present in a depth of about 6 nm.

13. The glass according to claim 1, wherein a proportion of reedmergnerite is at least 18 mol %.

14. A glass, having a composition which is characterized by the following constituent phases:

| A constituent phase | min. | max. |
|---|---|---|
| Albite | 10 mol % | 40 mol % |
| Reedmergnerite | 10 mol % | 65 mol % |
| Potassium reedmergnerite | 0 mol % | 32 mol % |
| Grossular | 0 mol % | 10 mol % |
| Cordierite | 0 mol % | 10 mol % |
| Willemite | 0 mol % | 15 mol % |
| Silicon dioxide | 0 mol % | 50 mol % |
| Diboron trioxide | 0 mol % | 15 mol % |
| Titanium wadeite | 0 mol % | 24 mol % |
| Strontium feldspar | 0 mol % | 20 mol % |
| Celsian | 0 mol % | 20 mol % | wherein a number of degrees of angular freedom per atom is calculated according to a formula:

$$f = \frac{\sum_{i=1}^{n} c_i \cdot z_i \cdot f_i}{\sum_{i=1}^{n} c_i \cdot z_i}, \quad (1)$$

wherein $f$ is the number of degrees of angular freedom per atom, $c_i$ is a mole fraction of the i-th constituent phase, $z_i$ is a number of atoms per structural unit in the i-th constituent phase, $f_i$ is a number of degrees of angular freedom per atom in the i-th constituent phase, and "n" is a number of constituent phases, such that said number of degrees of angular freedom per atom is not more than 0.25, wherein a coefficient of thermal expansion is calculated according to formulae:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \quad (2)$$

wherein $E_{pot}$ is an average potential well depth, m is a number of cation types present, $E_{pot,j}$ is a potential well depth for a j-th cation type, $z_{j,i}$ is a number of cations of the j-th type in an i-th constituent phase, $c_i$ is a mole fraction of the i-th constituent phase, and "n" is a number of constituent phases; and $$CTE = \left(\frac{51815\left(\frac{kJ}{Mol}\right)}{\overline{E_{pot}}} - 27.205\right) \text{ppm/K}, \quad (3)$$

wherein CTE is the thermal coefficient of thermal expansion, such that said coefficient of thermal expansion is from 6.5 ppm/K to <7.01 ppm/K.

15. A glass article, having a composition which is characterized by the following constituent phases:

| A constituent phase | min. | max. |
|---|---|---|
| Albite | 10 mol % | 40 mol % |
| Reedmergnerite | 10 mol % | 65 mol % |
| Potassium reedmergnerite | 0 mol % | 32 mol % |
| Grossular | 0 mol % | 10 mol % |
| Cordierite | 0 mol % | 10 mol % |
| Willemite | 0 mol % | 15 mol % |
| Silicon dioxide | 0 mol % | 50 mol % |
| Diboron trioxide | 0 mol % | 15 mol % |
| Titanium wadeite | 0 mol % | 24 mol % |
| Strontium feldspar | 0 mol % | 20 mol % |
| Celsian | 0 mol % | 20 mol %; | wherein a coefficient of thermal expansion is calculated according to formulae:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \quad (2)$$

wherein $E_{pot}$ is an average potential well depth, m is a number of cation types present, $E_{pot,j}$ is a potential well depth for a j-th cation type, $z_{j,i}$ is a number of cations of the j-th type in an i-th constituent phase, $c_i$ is a mole fraction of the i-th constituent phase, and "n" is a number of constituent phases; and $$CTE = \left(\frac{51815\left(\frac{kJ}{Mol}\right)}{\overline{E_{pot}}} - 27.205\right) \text{ppm/K}, \quad (3)$$

wherein the coefficient of thermal expansion calculated according to formulae (2) and (3) in a surface glass of the glass article corresponds to at least 50% and not more than 99% of the coefficient of thermal expansion calculated according to formulae (2) and (3) in a bulk glass of the glass article, wherein the surface glass is present in a depth of about 6 nm.

16. The glass according to claim 1, wherein a proportion of silicon dioxide is not more than 14 mol %.

17. The glass according to claim 1, wherein said number of degrees of angular freedom per atom is not more than 0.28.

18. The glass according to claim 1, wherein said number of degrees of angular freedom per atom is not more than 0.27.

19. The glass according to claim 14, wherein the coefficient of thermal expansion calculated according to formulae (2) and (3) in a surface glass corresponds to at least 50% of the coefficient of thermal expansion calculated according to formulae (2) and (3) in a bulk glass, wherein the surface glass is present in a depth of about 6 nm.

20. The glass according to claim 14, wherein the coefficient of thermal expansion calculated according to formulae (2) and (3) in a surface glass corresponds to not more than 99% of the coefficient of thermal expansion calculated according to formulae (2) and (3) in a bulk glass, wherein the surface glass is present in a depth of about 6 nm.

21. The glass according to claim 1, wherein a proportion of silicon dioxide is at least 5 mol %.

* * * * *